Dec. 26, 1961 R. J. JOHNSTON, JR 3,014,374
LINEAR ACCELEROMETER
Filed June 23, 1958 2 Sheets-Sheet 1

INVENTOR.
Robert J. Johnston, Jr.
BY
E. W. Christen
ATTORNEY

Dec. 26, 1961  R. J. JOHNSTON, JR  3,014,374
LINEAR ACCELEROMETER
Filed June 23, 1958  2 Sheets-Sheet 2

INVENTOR.
Robert J. Johnston, Jr.
BY
E. W. Christen
ATTORNEY

United States Patent Office 3,014,374
Patented Dec. 26, 1961

3,014,374
LINEAR ACCELEROMETER
Robert J. Johnston, Jr., Flint, Mich., assignor to General Motors Corporation, Detroit, Mich., a corporation of Delaware
Filed June 23, 1958, Ser. No. 743,773
2 Claims. (Cl. 73—517)

This invention relates to measuring instruments and more particularly to a device for measuring the linear acceleration of a body.

It is a principal object of this invention to provide an accelerometer of high sensitivity and accuracy over a wide range of input acceleration values and which is capable of withstanding high impact loading without damage or impairment of accuracy.

In accordance with this invention, the sensitivity and range of the accelerometer are determined by separate and independent parameters of the system so that sensitivity is uniform throughout the range of operation. This is accomplished by an accelerometer in which the sensitivity is determined by an acceleration sensor which operates within a constant, restricted range whereas the range of input acceleration values which may be measured is determined by an angular velocity developed in the system. This principle is embodied in an accelerometer having a primary input axis defined by the axis of rotation of the acceleration sensor. A controlled angular velocity is imparted to the sensor with its input axis extending transversely of the primary input axis. The sensor responds to a component of acceleration along the primary input axis and also responds to a component of the normal acceleration developed incident to its angular velocity to develop an error signal corresponding to the relative value of these components. The error signal controls a variable speed drive to maintain the angular velocity of the sensor at such value that the error signal is maintained at predetermined value and the angular velocity of the sensor is a measure of acceleration along the primary input axis. A more complete understanding of this invention may be had from the detailed description which follows taken with the accompanying drawings in which:

Figure 1:
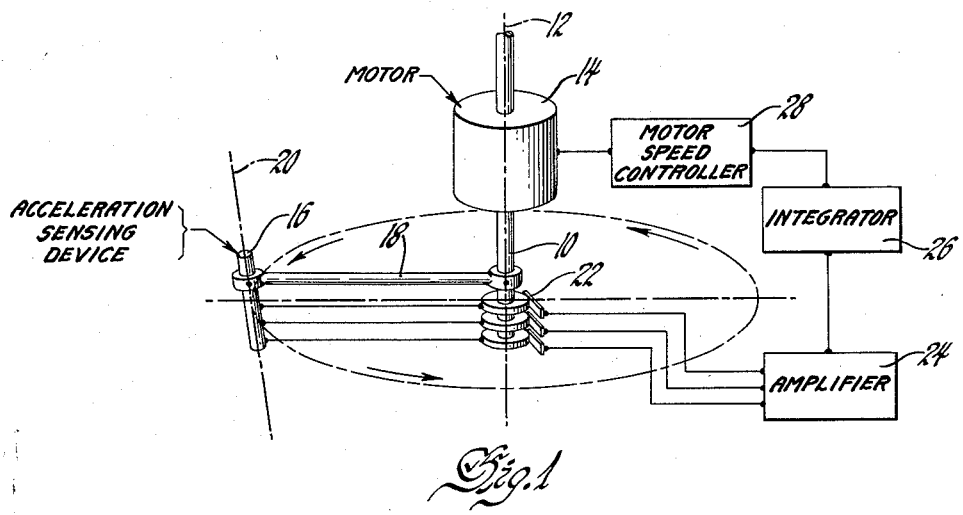
FIGURE 1 is a diagrammatic representation of the inventive accelerometer.

Referring now to the drawings, the illustrative embodiment of the invention, shown in FIGURE 1, comprises a rotatable member or shaft 10 defining a primary input axis 12 along which input accelerations are to be measured. The shaft 10 is rotatably driven by a variable speed motor 14 for imparting angular velocity through a rigid arm 18 to an acceleration sensor 16. The acceleration sensor 16 may take the form of any conventional linear accelerometer such as the constrained mass type of accelerometer. The sensor 16 has an input axis 20 which is disposed in a plane with the primary input axis 12 but extends transversely thereof to form a relatively small angle of divergence. The sensor 16 develops a signal voltage having an amplitude and phase or polarity corresponding to the magnitude and sense of the acceleration along its input axis 20 and this signal voltage is applied through a suitable rotatable connection such as slip rings 22 to a phase sensitive amplifier 24. The amplifier output voltage is applied through a time constant circuit or integrator 26 to a motor speed controller 28 which is connected with the motor 14 for controlling its speed in accordance with the signal voltage from the acceleration sensor 16.

Figure 3:
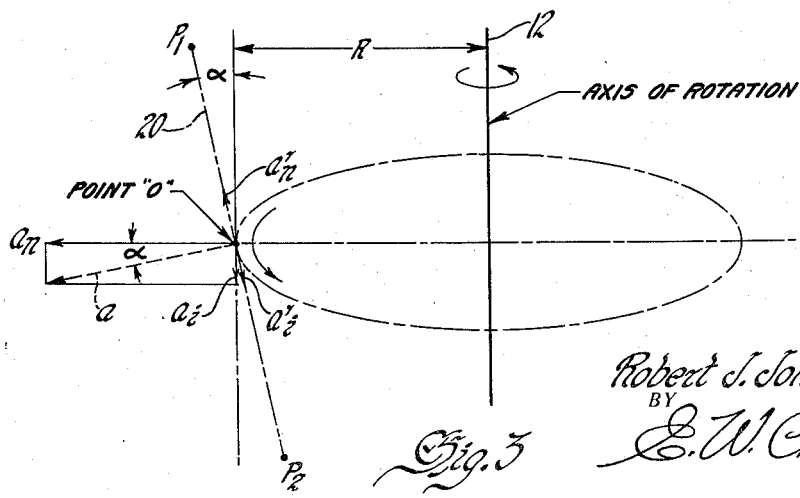
FIGURE 3 is a geometrical representation of the accelerometer of FIGURE 1 to facilitate its description.

The principles of operation may be readily understood from a consideration of the diagram of FIGURE 3. Consider the acceleration sensor 16 to be represented by the point O disposed at a radial distance R from the primary accelerometer axis 12 and having an angular velocity $w$. The sensor input axis 20 is inclined at an angle $\alpha$ with reference to the primary input axis 12. The normal acceleration $a_n$ of the point O is $$a_n = w^2 R \tag{1}$$

The value of input acceleration $a_i$ to be measured along the input axis 12 is combined vectorially with the normal acceleration $a_n$ to produce a resultant acceleration $a$ which is perpendicular to the sensor axis 20 when the normal acceleration $a_n$ and the input acceleration $a_i$ have a predetermined ratio. This predetermined ratio occurs when the component $a_n'$ of the normal acceleration $a_n$ on the input axis 20 is equal and opposite to the component $a_i'$ of the input acceleration $a_i$ along the axis 20. When this relationship obtains, the value of input acceleration $a_i$ to be measured is $$a_i = w^2 R \tan \alpha \tag{2}$$

From Equation 2, it is apparent that if both R and $\alpha$ are constant in value the acceleration to be measured is directly proportional to the square of angular velocity $w$. Accordingly, the angular velocity is varied in such manner that the acceleration components $a_n'$ and $a_i'$ are equal and opposite and the angular velocity is taken as the output signal of the accelerometer. In order to maintain the components $a_n'$ and $a_i'$ equal and opposite as the input acceleration varies, the algebraic summation of the components is taken as an error signal for controlling the angular velocity.

Consider now the effect of acceleration perpendicular to the primary input axis 12. Such a perpendicular acceleration will act on the point O in the same direction for all rotative positions of the point. Therefore, perpendicular acceleration will alternately add to and subtract from the error signal, i.e. the difference between the components $a_n'$ and $a_i'$. This will modulate the error signal at a frequency corresponding to the angular velocity of the point O with an amplitude corresponding to the magnitude of the perpendicular acceleration and in a phase relation corresponding to the direction of perpendicular acceleration. Accordingly, this modulation component may be either suppressed or utilized as desired.

Figure 2:
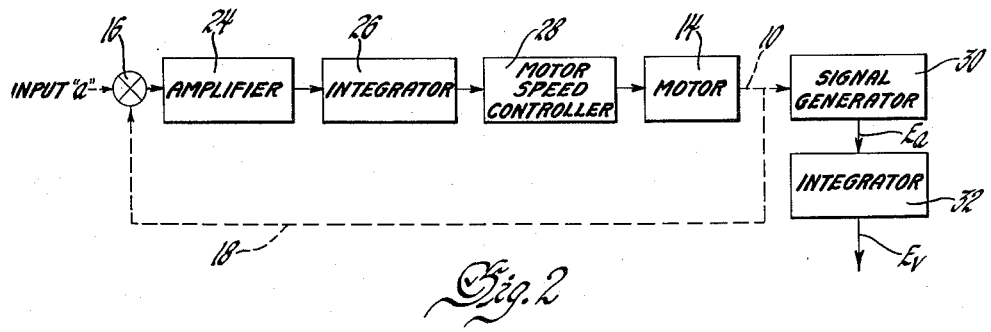
FIGURE 2 is a block diagram of an integrating accelerometer system employing the present invention.

In considering the operation of the embodiment of FIGURE 1, reference is made to FIGURES 1 and 2 and it may be assumed that the accelerometer is subjected to an input acceleration $a_i$ along its input axis 12. In this condition, the motor 14 will be energized and imparting angular velocity through its shaft 10 and arm 18 to the acceleration sensor 16 subjecting it to a normal acceleration $a_n$. The acceleration components $a_i'$ and $a_n'$ are equal and opposite and hence the error voltage $e$ is of zero or null value. If the accelerometer is subjected to a perpendicular acceleration, the error voltage will oscillate about its null value and will be applied through the amplifier 24 to the time constant circuit or integrator 26 which will develop a time average value of the error voltage. The time average value for the conditions assumed will be zero and hence the motor speed controller will remain unchanged and the motor speed will be maintained at a value indicative of the existing input acceleration $a_i$. If the input acceleration should increase, the component $a_i'$ will momentarily predominate over the component $a_n'$ to produce an error voltage having a phase sense or polarity which will cause the motor speed controller 28 to increase the rotative speed of the motor until the error signal is reduced to null value. Likewise, if the input acceleration should decrease in value, the normal acceleration component $a_n'$ will predominate over the input acceleration component $a_i'$ to produce an error voltage of the opposite phase sense or polarity which will cause the motor speed controller to reduce the rotative speed of the acceleration sensor 16 until the error voltage is reduced to null value. Thus, the rotative speed of the motor shaft is a measure of the value of input acceleration and, as previously mentioned, the measured acceleration is proportional to the square of the angular velocity or motor speed. Accordingly, as indicated in FIGURE 2, an acceleration signal voltage may be developed by a transducer or signal generator 30 driven by the shaft 10 of motor 14 to develop a signal voltage $E_a$ having an amplitude corresponding to the square of shaft speed. Velocity information is derived by applying the signal voltage $E_a$ to an integrator 32 which developes a signal voltage $E_v$ corresponding to the instantaneous translational velocity of the accelerometer.

Figure 4:
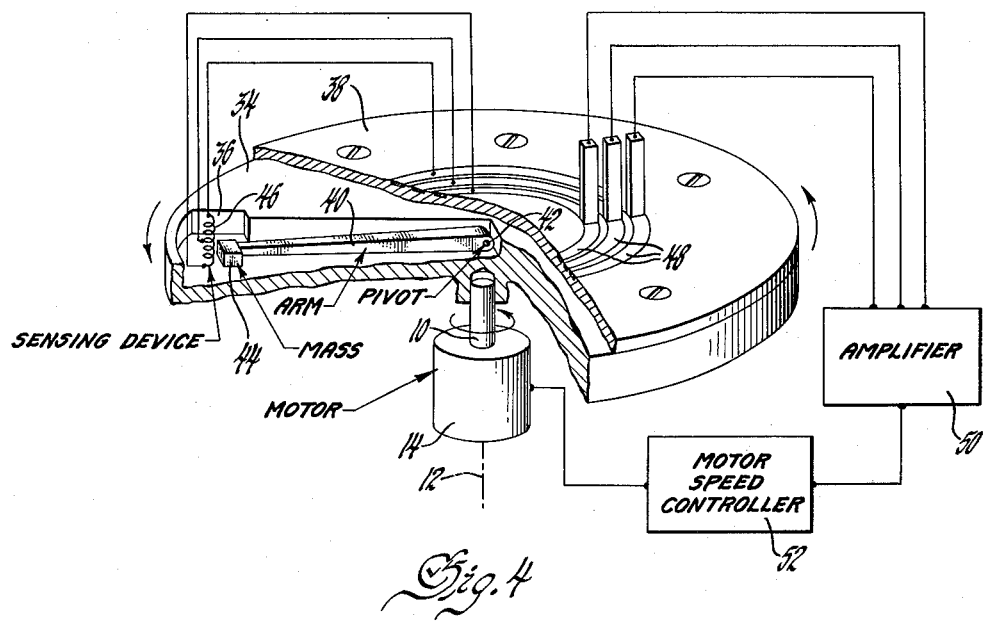
FIGURE 4 is a diagrammatic representation of another embodiment of the inventive accelerometer.
Figure 5:
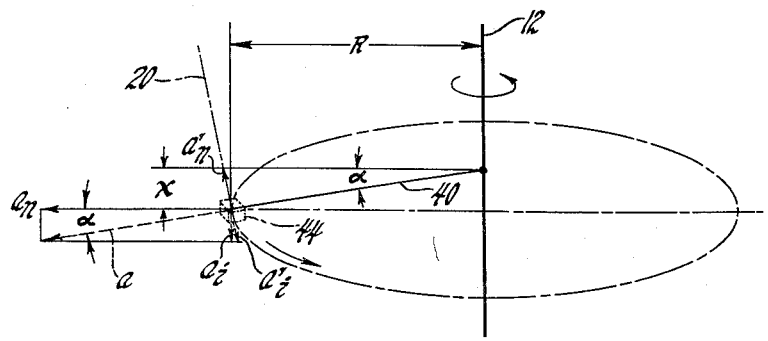
FIGURE 5 is a geometrical representation of the accelerometer of FIGURE 4.

The embodiment of the invention illustrated in FIGURES 4 and 5 is similar in many respects to the embodiment just described but utilizes a different form of acceleration sensor. The shaft 10 defines the primary input axis 12 of the accelerometer and is rotatably driven by a variable speed motor 14. A support plate 24 is secured to the shaft 10 for rotation therewith and is provided with a radially extending T-shaped channel 36 and a suitable cover plate 38. Within the channel 36 is disposed a pivot arm 40 having a pivot axis 42 extending transversely of the input axis 12. The pivot arm 40 supports a proof mass 44 at its outer end which is capable of limited translational motion in the direction of the input axis 12. A displacement sensing device or pick-up coil 46 is disposed adjacent the proof mass 44 and is connected through slip rings 48 to the amplifier 50 for developing an error signal voltage having an amplitude corresponding to the displacement of the proof mass 44 from a reference position. The output voltage from the amplifier 50 is applied to a motor speed controller 52 which in turn is connected with the motor 14 to vary its speed in accordance with the value of the error signal voltage.

As shown in FIGURE 5, with the proof mass 44 in its reference position, the pivot arm 40 forms an angle $\alpha$ with a line perpendicular to the primary input axis 12. The proof mass 44 and pick-up coil 46 form an acceleration sensor having an input axis 20 which extends transversely of the input axis 12 forming an angle of divergence $\alpha$. The proof mass 44 is subjected to a normal acceleration $a_n$ directly proportional to a square of its angular velocity and radius of rotation R. The normal acceleration $a_n$ will have a component $a_n'$ along the input axis 20. The proof mass will also be subjected to the input accelerations along the axis 12 which will have a component $a_i'$ along the input axis 20. With the radius of rotation R and the angle $\alpha$ at constant values, the proof mass will be in its reference position when the acceleration components $a_i'$ and $a_n'$ are equal and opposite and the square of angular velocity must vary as the input accelerations.

In order to maintain the angular velocity at the value corresponding to input acceleration, an error voltage corresponding to the difference between the acceleration components $a_n'$ and $a_i'$ is developed by the pick-up coil 46 and amplifier 50 and applied to the motor speed controller 22 to vary the speed of motor 14 accordingly. In the embodiment of FIGURE 4, the effect of accerelations perpendicular to the input axis is suitably suppressed by utilizing a sensor with a sensitivity lower than that expected magnitude of accelerations prependicular to the primary input axis. The operation of the embodiment of FIGURE 4 is otherwise the same as that described with reference to the embodiment of FIGURE 1.

Although the description of this invention has been given with respect to a particular embodiment, it is not to be construed in a limiting sense. Numerous variations and modifications within the spirit and scope of the invention will not occur to those skilled in the art. For a definition of the invention, reference is made to the appended claims.

I claim:
1. An accelerometer comprising a linear acceleration sensor adapted to product a signal voltage corresponding to the magnitude of acceleration along the sensor input axis, a rotatable support having an axis of rotation defining the accelerometer input axis, said acceleration sensor being mounted on said support with its input axis inclined obliquely relative to the accelerometer input axis whereby the sensor responds to the algebraic summation of an input component of acceleration along the accelerometer input axis and a component of normal acceleration produced by rotation of said support, said sensor thereby developing an error signal voltage corresponding to the difference of these components, said sensor also responding to acceleration transversely of the accelerometer input axis whereby the transverse acceleration component modulates said summation of input and normal components of acceleration to produce an oscillatory component in the error signal voltage, said oscillatory component having a phase angle and amplitude indicative respectively of the direction and magnitude of said transverse acceleration, a variable speed motor connected with the support, and motor control means connected between the sensor and the motor to vary the speed of the motor to cause said component of normal acceleration to become equal and opposite to said component of acceleration along the input axis.

2. An accelerometer comprising a linear acceleration sensor adapted to produce a signal voltage corresponding to the magnitude of acceleration along the sensor input axis, a rotatable support having an axis of rotation defining the accelerometer input axis, said acceleration sensor being mounted on said support with its input axis inclined obliquely relative to the accelerometer input axis whereby the sensor responds to the algebraic summation of an input component of acceleration along the accelerometer input axis and a component of normal acceleration produced by rotation of said support, said sensor thereby developing an error signal voltage corresponding to the difference of these components, said sensor also responding to acceleration transversely of the accelerometer input axis whereby the transverse acceleration component modulates said summation of input and normal components of acceleration to product an oscillatory component in the error signal voltage, said oscillatory component having a phase angle and amplitude indicative respectively of the direction and magnitude of said transverse acceleration, a variable speed motor connected with the support, time constant means connected with sensor to eliminate said oscillatory component from the error signal voltage, and motor control means connected between the sensor and the motor to vary the speed of the motor to reduce said error signal voltage to null.

References Cited in the file of this patent

UNITED STATES PATENTS

| | | |
|---|---|---|
| 2,319,940 | Marrison | May 25, 1943 |
| 2,591,921 | Cosgriff et al. | Apr. 8, 1952 |
| 2,801,097 | Adamson | July 30, 1957 |
| 2,853,287 | Draper et al. | Sept. 23, 1958 |
| 2,928,667 | Peterson | Mar. 15, 1960 |

FOREIGN PATENTS

| | | |
|---|---|---|
| 3,353/31 | Australia | Aug. 4, 1932 |

OTHER REFERENCES

"American Journal of Physics," April 1951, pages 245–246.